United States Patent

Asvatha Narayanan et al.

(10) Patent No.: US 9,390,506 B1
(45) Date of Patent: Jul. 12, 2016

(54) SELECTIVE OBJECT FILTERING AND TRACKING

(71) Applicant: Aricent Holdings Luxembourg S.A.R.L., Luxembourg (LU)

(72) Inventors: Vishnu Vardhanan Asvatha Narayanan, Bangalore (IN); Sk Sahariyaz Zaman, Bangalore (IN); Kalyan Kumar Hati, Bangalore (IN)

(73) Assignee: Aricent Holdings Luxembourg S.A.R.L., Luxembourg (LU)

( * ) Notice: Subject to any disclaimer, the term of this patent is extended or adjusted under 35 U.S.C. 154(b) by 0 days.

(21) Appl. No.: 14/706,372

(22) Filed: May 7, 2015

(51) Int. Cl.
*G06K 9/00* (2006.01)
*G06T 7/00* (2006.01)
*G06K 9/32* (2006.01)
*G06K 9/46* (2006.01)
*G06T 7/40* (2006.01)
*G06T 5/20* (2006.01)

(52) U.S. Cl.
CPC .......... *G06T 7/0067* (2013.01); *G06K 9/00765* (2013.01); *G06K 9/3241* (2013.01); *G06K 9/468* (2013.01); *G06T 5/20* (2013.01); *G06T 7/004* (2013.01); *G06T 7/0081* (2013.01); *G06T 7/408* (2013.01); *G06T 2207/10016* (2013.01)

(58) Field of Classification Search
None
See application file for complete search history.

(56) References Cited

PUBLICATIONS

Object Tracking: A Survey, ACM Computing Surveys, vol. 38, No. 4, Article 13, Dec. 2006 by Alper Yilmaz, Omar Javed, and Mubarak Shah.

An Iterative Image Registration Technique With an Application to Stereo Vision, Proceedings of the 7th International Joint Conference on Artificial Intelligence (IJCAI), vol. 2, pp. 674-679, Apr. 1981 by Bruce D. Lucas and Takeo Kanade.
Detection and Tracking of Point Features, Computer Science Department, Carnegie Mellon University, pp. 1-20, Apr. 1991 by C. Tomasi and T. Kanade.
Good Features to Track, IEEE Conference on Computer Vision and Pattern Recognition (CVPR94), Jun. 1994, pp. 593-600, by J. Shi and C. Tomasi.
A Combined Corner and Edge Detector, Proceedings of the 4th Alvey Vision Conference, pp. 147-151, Aug. 1988 by C. Harris and M. Stephens.
The Estimation of the Gradient of a Density Function, With Applications in Pattern Recognition, IEEE Transactions on Information Theory, vol. 21, No. 1, pp. 32-40, Jan. 1975 by K. Fukunaga and L. Hostetler.
Real Time Face and Object Tracking as a Component of a Perceptual User Interface, Fourth IEEE Workshop on Applications of Computer Vision, pp. 214-219, Oct. 1998 by G.R. Bradski.

(Continued)

*Primary Examiner* — Atiba O Fitzpatrick
(74) *Attorney, Agent, or Firm* — Harrington & Smith

(57) ABSTRACT

A computer-implemented method for tracking an object in a video including, in a first video frame: filtering the first video frame to delineate foreground from background and to select from the foreground an object to be tracked, said object identified at least by contour, center and color; constructing a first virtual bounding box minimally enclosing said object; using a tracking algorithm to establish a target location for the object in the second video frame based on similarity to the object identified in the first video frame; constructing a second virtual bounding box minimally enclosing the target shape at the target location; extending the second virtual bounding box; filtering the second video frame to delineate foreground from background using weighted values propagated from at least the first frame; scrutinizing the output of the second video frame by matching at least shape and color of the target shape at the target location.

20 Claims, 9 Drawing Sheets

(56) References Cited

PUBLICATIONS

Mean Shift: A Robust Approach Toward Feature Space Analysis, IEEE Trans. Pattern Anal. Mach. Intell., vol. 24, No. 5, pp. 603-619, May 2002 by Dorin Comaniciu and Peter Meer.

Kernel-Based Object Tracking, IEEE Transactions on Pattern Analysis and Machine Intelligence, vol. 25 No. 5, pp. 564-577, May 2003 by D. Comaniciu, V. Ramesh, and P. Meer.

Robust Mean-Shift Tracking With Corrected Background-Weighted Histogram., IET Computer Vision, vol. 6, No. 1, pp. 62-69, Jan. 2012 by J. Ning, L. Zhang, D. Zhang, and C. Wu.

Mean-Shift Blob Tracking With Adaptive Feature Selection and Scale Adaptation, IEEE International Conference on Image Processing, pp. 369-372, Sep. 2007 by Dawei Liang, Qingming Huang, Shugiang Jiang, Hongxun Yao, and Wen Gao.

Robust Scale Adaptive Mean-Shift for Tracking, Scandinavian Conference on Image Analysis, vol. 7944, pp. 652-663, Springer Berlin Heidelberg, 2013 by Tomas Vojir, Jana Noskova, and Jiri Matas.

Watersheds in Digital Spaces: An Efficient Algorithm Based on Immersion Simulations, IEEE Trans. Pattern Anal. Mach. Intell., vol. 13, No. 6, pp. 583-598, Jun. 1991 by Luc Vincent and Pierre Soille.

An Algorithm for Finding Best Matches in Logarithmic Expected Time, ACM Trans. Math. Softw., vol. 3, No. 3, pp. 209-226, Sep. 1977 by H. Friedman, Jerome, Jon Louis Bentley, and Raphael Ari Finkel.

Real-Time Tracking of Non-Rigid Objects Using Mean Shift, IEEE Conference on Computer Vision and Pattern Recognition, pp. 142-149, Jun. 2000 by D. Comaniciu, V. Ramesh, and P. Meer.

Review and Improvement Areas of Mean Shift Tracking Algorithm, The 18th IEEE International Symposium on Consumer Electronics (ISCE 2014), pp. 132-133, Jun. 2014 by Kalyan Kumar Hati and A Vishnu Vardhanan.

Fast Template Matching, Vision Interface, pp. 120-123, 1995 by J. P. Lewis.

The Divergence and Bhattacharyya Distance Measures in Signal Selection, IEEE Transactions on Communication Technology, vol. 15, No. 1, pp. 52-60, Feb. 1967 T. Kailath.

SELECTIVE OBJECT FILTERING AND TRACKING

RELATED APPLICATIONS

The present application is related to co-pending U.S. application Ser. No. 14/496,544 filed on Sep. 25, 2014 by inventors Vishnu Vardhanan Asvatha Narayanan and Sk Sahariyaz Zaman, which is incorporated herein by reference in its entirety.

TECHNICAL FIELD

The invention relates generally to multimedia applications; image and video editing; image and video cut-outs; and selective filtering of video frames. Specifically, embodiments of the present invention relate to tracking an object in a video sequence.

BACKGROUND

Object tracking is a low level computer graphics and has been extensively investigated in the past two and half decades. Object tracking has applications in numerous fields, such as video editing, video conferencing, video indexing, vehicle navigation etc. In different frames of a video a given object changes its position both absolutely and relative to other objects, and becomes subject to different lighting and shadow conditions. There are numerous challenges in accurately tracking an object in a video including: noise in the video frames, complex object motion and shape, occlusion, and changes in illumination.

Several approaches to object tracking have been suggested. Some that are relevant to these teachings are described in the following documents: [1] OBJECT TRACKING: A SURVEY, *ACM Computing Surveys*, Vol. 38, No. 4, Article 13, December 2006 by Alper Yilmaz, Omar Javed, and Mubarak Shah; [2] AN ITERATIVE IMAGE REGISTRATION TECHNIQUE WITH AN APPLICATION TO STEREO VISION, *Proceedings of the 7th International Joint Conference on Artificial Intelligence (IJCAI)*, Volume 2, pp. 674-679, April 1981 by Bruce D. Lucas and Takeo Kanade; [3] DETECTION AND TRACKING OF POINT FEATURES, *Computer Science Department, Carnegie Mellon University*, pp. 1-20, April 1991 by C. Tomasi and T. Kanade; [4] GOOD FEATURES TO TRACK, *IEEE Conference on Computer Vision and Pattern Recognition (CVPR94)*, June 1994, pp. 593-600, by J. Shi and C. Tomasi; [5] A COMBINED CORNER AND EDGE DETECTOR, *Proceedings of the 4th Alvey Vision Conference*, pp. 147-151, August 1988 by C. Harris and M. Stephens; [6] THE ESTIMATION OF THE GRADIENT OF A DENSITY FUNCTION, WITH APPLICATIONS IN PATTERN RECOGNITION, *IEEE Transactions on Information Theory*, Vol. 21, No. 1, pp. 32-40, January 1975 by K. Fukunaga and L. Hostetler; [7] REAL TIME FACE AND OBJECT TRACKING AS A COMPONENT OF A PERCEPTUAL USER INTERFACE, *Fourth IEEE Workshop on Applications of Computer Vision*, pages 214-219, October 1998 by G. R. Bradski; [8] MEAN SHIFT: A ROBUST APPROACH TOWARD FEATURE SPACE ANALYSIS, *IEEE Trans. Pattern Anal. Mach. Intell.*, Vol. 24, No. 5, pp. 603-619, May 2002 by Dorin Comaniciu and Peter Meer; [9] KERNEL-BASED OBJECT TRACKING, *IEEE Transactions on Pattern Analysis and Machine Intelligence*, Vol. 25 No. 5, pp. 564-577, May 2003 by D. Comaniciu, V. Ramesh, and P. Meer; [10] ROBUST MEAN-SHIFT TRACKING WITH CORRECTED BACKGROUND-WEIGHTED HISTOGRAM., *JET Computer Vision*, Vol. 6, No. 1, pp. 62-69, January 2012 by J. Ning, L. Zhang, D. Zhang, and C. Wu; [11] MEAN-SHIFT BLOB TRACKING WITH ADAPTIVE FEATURE SELECTION AND SCALE ADAPTATION, *IEEE International Conference on Image Processing*, pages 369-372, September 2007 by Dawei Liang, Qingming Huang, Shugiang Jiang, Hongxun Yao, and Wen Gao; [12] ROBUST SCALE ADAPTIVE MEAN-SHIFT FOR TRACKING, *Scandinavian Conference on Image Analysis*, Vol. 7944, pp. 652-663, Springer Berlin Heidelberg, 2013 by Tomas Vojir, Jana Noskova, and Jiri Matas; [13] WATERSHEDS IN DIGITAL SPACES: AN EFFICIENT ALGORITHM BASED ON IMMERSION SIMULATIONS, *IEEE Trans. Pattern Anal. Mach. Intell.*, Vol. 13, No. 6, pp. 583-598, June 1991 by Luc Vincent and Pierre Soille; [14] AN ALGORITHM FOR FINDING BEST MATCHES IN LOGARITHMIC EXPECTED TIME, *ACM Trans. Math. Softw.*, Vol. 3, No. 3, pp. 209-226, September 1977 by H. Friedman, Jerome, Jon Louis Bentley, and Raphael An Finkel; [15] REAL-TIME TRACKING OF NON-RIGID OBJECTS USING MEAN SHIFT, *IEEE Conference on Computer Vision and Pattern Recognition*, pp. 142-149, June 2000 by D. Comaniciu, V. Ramesh, and P. Meer; [16] REVIEW AND IMPROVEMENT AREAS OF MEAN SHIFT TRACKING ALGORITHM, *The 18th IEEE International Symposium on Consumer Electronics (ISCE 2014)*, pages 132-133, June 2014 by Kalyan Kumar Hati and A Vishnu Vardhanan; [17] FAST TEMPLATE MATCHING, *Vision Interface*, pp. 120-123, 1995 by J. P. Lewis; [18] THE DIVERGENCE AND BHATTACHARYYA DISTANCE MEASURES IN SIGNAL SELECTION, *IEEE Transactions on Communication Technology*, Vol. 15, No. 1, pp 52-60, February 1967 T. Kailath.

Two of the most promising approaches from the references above are the Kanade Lucas Tomashi (KLT) and mean shift (MS) tracker. The KLT tracker, described in documents [2-4], estimates the link motion vectors in the successive frames to track each Harris and Stephens corner points (document [5]) in a given region. The MS tracker described in document [8] finds the most similar candidate based on a histogram similarity function using the selected region of interest around the target location given by the user.

Generally, MS tracking involves both accurate detection of an object's center, and adaptation to a change in the scale of the object. Much work has been done on the former issue with some promising results, but there has not been much success on the scale adaptation issue. Generally, current approaches can accurately find the object's center position, but often fail when object scaling is present. Therefore, there is a need for an object tracking approach that can detect an object in a video with minimal user input and accurately track the object throughout a video.

SUMMARY

Certain embodiments of these teachings are directed to an apparatus such as a host computing device, a method and a computer readable memory storing a computer executable program that satisfy the need for accurately tracking an object in a video with minimal user input.

A method for tracking an object in a video having certain features of these teachings comprises:

in a first video frame of the video:
   filtering the first video frame to delineate foreground from background and to select from the foreground an object to be tracked, said object identified at least by contour, center and color;
   constructing a first virtual bounding box minimally enclosing said object;
in a second video frame of the video:
   using a tracking algorithm to establish a target location for the object in the second video frame based on similarity to the object identified in the first video frame;

constructing a second virtual bounding box minimally enclosing the target shape at the target location;

extending the second virtual bounding box by an predefined amount;

filtering the object within the extended second virtual bounding box of the second video frame to delineate foreground from background using weighted values propagated from at least the first frame;

resolving the object in the second video frame by matching at least shape and color of the target shape at the target location against said contour and color identified for the object in the first video frame; and within a digital video stream separate and independent of the video, outputting the resolved object of the second video frame to a tangible memory and/or to a graphical display.

A computing device or other such apparatus embodying the teachings herein may comprise at least one digital processor and at least one computer readable memory storing a computer readable program/computer executable code which when executed by the at least one processor causes the apparatus to perform the method essentially as summarized above. Other embodiments implementing these teachings may comprise the computer readable memory on which is stored such a program or executable code, which may then be distributed to end users who may then install the program from that memory onto their own computer's native memory or have their computer run the program directly from the non-native memory itself.

BRIEF DESCRIPTION OF THE DRAWINGS

These and other features, aspects, and advantages will become better understood with regard to the following description, appended claims, and accompanying drawings.

DETAILED DESCRIPTION

Figure 1:
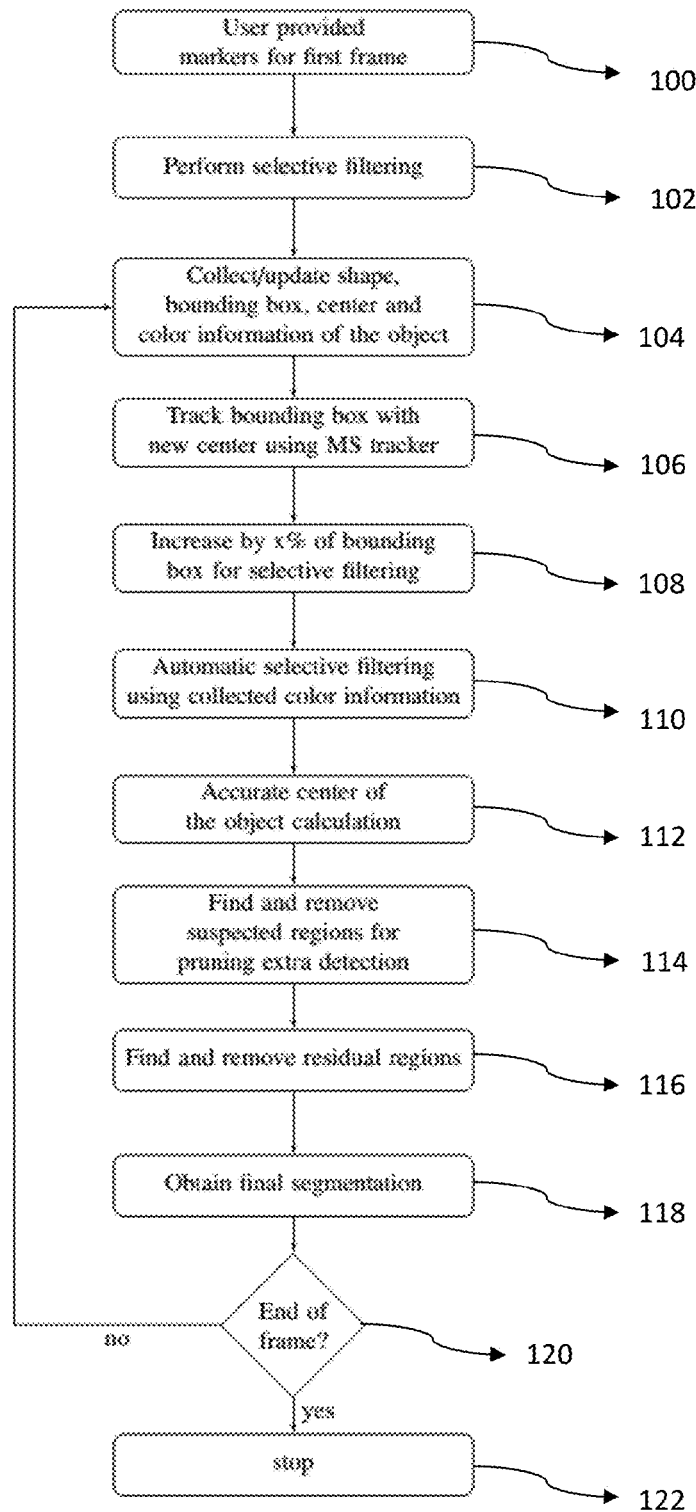
FIG. 1 is a high level flow chart according to an example embodiment of the invention.

In the Summary above and in the Detailed Description and the claims below, and in the accompanying drawings, reference is made to particular features (including method steps) of the invention. It is to be understood that these various features may be combined despite that the description herein does not explicitly detail every possible such combination. The specific embodiments that are detailed with particularity herein are not a limit to the general teachings herein, and such exemplary embodiments by themselves are not a limit to the scope of the ensuing claims but rather teach the principles of the invention and illuminate the meaning of such ensuing claims.

As previously mentioned in the background section, two popular algorithms used in object tracking are the Mean Shift tracker and the KLT tracker. The inventors understand the mean shift algorithm was initially introduced by Fukunaga and Hostetler in 1975 in document [6], and was used to estimate the gradient of a density function. Later, this technique was used to detect faces and objects in the Continuously Adaptive Mean Shift (CAMShift) algorithm described in document [7]. The MS tracker from document [8] brought a revolution in the field of object tracking, popularly known as Kernel based Object Tracking which mostly relies on color density to help track objects.

MS trackers generally suffer because they are primarily focused on the MS data and do not account for an object's other features. For example, kernel based object tracking does not function well when some of the target object's features are also present in the background. One way this problem of local minima has been addressed is by introducing a Background-Weighted Histogram (BWH) concept to the existing algorithm to decrease the background interference in the target representation, described in documents [9-10].

The current tracking algorithms also have difficulty handling situations where the object is scaled from frame to frame. Scaling may occur when an object is drifted, shrunk, expanded, changed in posture/shape, or rotated in subsequent frames of a video. Some current approaches suffer from several shortcomings, including: they do not work well when an object's size increases, are limited from a time and space complexity point of view, and are overly complex and require a large number of arguments.

Exemplary embodiments of these teachings address these scale adaptation issues and provide a more efficient and accurate process for tracking an object in a video. Certain embodiments address the shortfalls of previous approaches by one or more of the following:

i. selectively filtering and tracking the intended object automatically with scale adaptation;

ii. using image segmentation in a first frame with user provided markers;

iii. intuitively propagating strong foreground and background information from previous frames;

iv. using step ii to automate the background selection process in the second frame onwards;

v. finding the center of the object from a previous frame to calculate the current frame's center;

vi. extracting a contour from a segmented foreground portion, and examining each angle along the contour to validate the contour points between previous frames and the current frame and marking suspect points; and vii. using the shape of the contour to scrutinize the suspect points and remove regions which may have been accidentally detected in the current frame.

Accurately detecting borders of an object and segmenting a first frame of a video allows the object to be successful tracked with scale adaptation in each subsequent frame. Image segmentation involves separating a desired target of an image from the image background. Typically, image segmentation is a difficult task and requires significant user input. One example image segmentation process is described in co-pending U.S. patent application Ser. No. 14/496,544, referenced above. This segmentation process usually does not require any user background markers, as the process is capable of intelligently picking the background information, through user-input background markers can certainly aid the process.

FIG. 1 shows a high level flow chart of certain embodiments of the invention. Each step is further discussed below. Optionally, at step 100, a user provides markers to indicate a target object to be tracked, preferably this is done in the first frame that bears the object in the video. Selective filtering is performed at step 102 to separate the object from the background, for example by using the technique described by U.S. patent application Ser. No. 14/496,544. Step 104 is performed on the first frame and for the iterative loop from steps 104 to 120. One or more subsequent frames are processed, for example a 'second frame', using certain information from previous frames, including the 'first frame'. This convention may be continued through an entire video clip, for example the 'second frame' referring to whatever current frame is being processed and the 'first frame' referring to some earlier frame from which the object was previously identified. In this regard the 'first frame' may be the initial frame of the whole video clip in which the object was first identified (such as by user markings), or it may be some frame previous to the current frame being processed which was earlier processed by these teachings to precisely identify the object to be tracked. In a preferred embodiment each 'second' frame is consecutive in the video after its respective 'first' frame. These teachings may be employed such that the algorithm of FIG. 1 operates for each frame of the video in which the given object appears, or in other embodiments it may operate only on some of them in which the object is present in further frames disposed in the overall video between the described 'first' and 'second' frames. At step 104 various parameters from the first frame are collected and/or updated including: the contour of the object, the center and location of a virtual bounding box, and the color information of the object. A virtual bounding box is a box which overlays a frame of the video such that the size and location of the box minimally encloses the target object. The first virtual bounding box and other information collected at step 104 are from the first frame, while step 106 through 118 concerns the second frame. At step 106, the object is tracked, using an MS tracker for example, and a new center of a second virtual bounding box is determined. The size of the second virtual bounding box is increased to account for movements of the object at step 108, where such movements may result in the object scaling larger or smaller. So for example if the first virtual bounding box at step 104 is the initial frame of the video in which the object is present and user inputs/marks are used to identify the object to be tracked, then the virtual bounding box from that first frame at step 104 may be considered VBbox1, VBbox1 is given to the MS tracker at step 106 when the second frame is being processed, the second virtual bounding box with the new center at step 106 is in the second frame and may be considered VBbox2, and VBbox2 in the second frame is the box that is expanded at step 108. Automatic selective filtering is applied to the area enclosed by the extended virtual bounding box, defined at box 108, using the collected color information at step 110. Step 112 calculates the accurate center of the object. The accurate center is used to compare points of suspect regions along the shape of the object from one frame to the next. If the suspect regions are not similar, then the regions are considered defective and removed from the suspect regions in step 114. Step 116 finds and removes any residual regions that result from the removal of defective regions. The final image segmentation distinguishes the object from the remainder of the frame is performed at step 118, and all or part of the process is carried out for any additional subsequent frames of the video once the end of processing for the second frame is reached at step 120. The algorithm stops at step 122 if there are no further frames of the video to process.

Although other processes for image segmentation may be used, embodiments of the invention described herein refer to the image segmentation process described by U.S. patent application Ser. No. 14/496,544. Similarly, embodiments of the invention described herein refer to the MS tracking algorithm but other tracking algorithms may also be used.

A. Indication of Target Object

At step 100, user inputs are required in some embodiments to identify the target object to be tracked. User foreground markers and optional user background markers in this initial frame are the only inputs to be provided from the user for the first frame alone. When the object to be tracked is identified, discrimination filtering is applied for all regions and local neighborhood classifications using strong foreground and background information. The image is first over-segmented using a mean shift algorithm. This pre-segmentation uniquely labels each region denoted as L. Foreground regions are denoted as $N_f$, any user marked foreground regions are denoted by $M_f$, optionally any background regions are denoted $N_b$, any user marked background regions are denoted $M_b$. A default background region B is automatically selected based on the "Region of Interest" (ROI) border regions, wherein border refers to the border of the frame and not a divider between foreground and background.

B. Selective Filtering on a First Frame

After a target to be tracked is identified, segmentation is performed on the first frame of the overall video in which the object appears, and the default background regions B are scrutinized against the user marked foreground regions $M_f$ as explained in co-owned U.S. patent application Ser. No. 14/496,544. This 'first frame' refers to the initial frame in which the algorithm first identifies the object to be tracked, and for example may be that frame in which the user markers for foreground (and optionally background) regions are input, and as such this first frame may be the initial frame of an overall video, the initial frame in which the object to be tracked is present, or some subsequent frame in which the object is present. The resulting possible foreground $P_f$ and possible background $P_b$ regions are obtained. The initial background $B_{init}$ is determined by $P_b \cup M_b$. If the user does not provide any background markers, then $M_b$ will be assigned NULL. A discrimination filter is applied using $B_{init}$ and the user marked foreground regions $M_f$ as inputs. The discrimination filter may use a conventional binary k-d tree for classifying foreground and background regions either as strong foreground regions $S_f$, strong background regions $S_b$, or ambiguous regions G which are those classified as neither strong foreground nor strong background. Ambiguous regions G are resolved by utilizing the local neighbor information, namely, by finding the most similar regions using minimum inter color distance. The resolution of ambiguous regions will form weak foreground regions $W_f$ and weak background regions $W_b$. Segmentation is completed with pruning using the following three steps:

a) Merge the strong and weak foreground regions, $SW_f$, and merge the strong and weak background regions, $SW_b$:

$$SW_f = S_f \cup W_f \quad \text{Eq. 1}$$

$$SW_b = S_b \cup W_b \quad \text{Eq. 2}$$

b) Fill the gaps of foreground segmentation $SW_f$ that is surrounded with foreground region; and
c) Remove any isolated foreground regions depending upon the user foreground marker.

Final Segmentation can be termed as selective filtering segmented foreground $SFSeg_f$ and background $SFSeg_b$.

C. Collect Information

In exemplary embodiments of the invention, at step 104 the following information is collected from a first frame in the video in preparation for processing a second frame of the video. This second frame refers to any frame of the video subsequent to the first frame but preferably is consecutive after the first frame which was processed immediately prior to the second. For the case in which the 'first frame' is the initial frame of the overall video in which the object being tracked appears, the user markers may be used as the basis to generate this information initially.

a) Contour of the object, $Con_f$ is calculated by computing the perimeter of the $SFSeg_f$ where $SFSeg_f$ is the binary image. A binary image is a digital image that has only two values for each pixel such that the values indicate whether the pixel is background or foreground.
b) Extreme points of $SFSeg_f$ is computed to get the exact bounding box $Bb_{x,y,h,w}$ where x, y is the left corner of the bounding box position, w is width of the bounding box and h is the height of the bounding box.
c) Center $(x_c, y_c)$ of the object is computed as:

$$x_c = x + w/2 \quad \text{Eq. 3}$$

$$y_c = y + h/2 \quad \text{Eq. 4}$$

d) Mean values of strong foreground regions $S_f$ from the previous X frames, the current frame, and from the first frame are collected, and this is termed as the virtual foreground Vf.

$$V_f = S_f^n \cup S_f^{n-1} \cup S_f^{n-2} \ldots \cup S_f^{n-X} \cup S_f^1 \quad \text{Eq. 5}$$

Where n is the current frame of the video sequence and n≥0.

Similarly, mean values of strong background regions $S_b$ from the previous X frames, the current frame and from the first frame are collected, which is termed as the virtual background Vb.

$$V_b = S_b^n \cup S_b^{n-1} \cup S_b^{n-2} \ldots \cup S_b^{n-X} \cup S_b^1 \quad \text{Eq. 6}$$

The reason for propagating the information from the previous frames is to better accommodate recent variations due to slight illumination changes. The information from the first frame provides any potential user marked and classified strong foreground information which helps in the appropriate segmentation.

For the first X frames, if any of the predecessor frames are not available, then $S_f^{n-X}$ and $S_b^{n-X}$ are considered as NULL, and accordingly, $V_f$ and $V_b$ can be computed. Image segmentation in the first frame will be based on the identified object, the user marked foreground regions and the default background (or user marked and determined background).

D. Mean Shift Tracker

At step 106, embodiments of the invention can use mean shift tracking to provide a general framework for finding a target model location from a target candidate location. This can be accomplished by finding the most similar candidate based on a similarity function using, for example, color density obtained by probability distributions calculated by weighted histograms. The weights are derived from an Epanechnikov kernel profile as described in documents [9] and [15]. The similarity of the target model and the target candidate are obtained through minimizing the distance correspondence to maximizing the Bhattacharya co-efficient as described in documents [9], [15], [16]. In certain embodiments of the invention, the outcome of mean shift tracking is the centroid $C_{new}$ of the new location and its bounding box $Bbnew_{x,y,h,w}$. The background-weighted histogram (BWH) to the MS tracker is used to decrease the background interference in the target representation as explained in document [9].

E. Extended Bounding Box

At step 108, after obtaining the bounding box $Bbnew_{x,y,h,w}$ through the MS tracker, the bounding box from step 106 is extended by x %. The bounding box can be extended by a predetermined value inputted by the user, or extended by a default value in the absence of a user input. For subsequent frames, the percentage that the bounding box is extended may derived from the change in size from a previous frame's bounding box. Extending the bounding box helps when in the selective filtering process when the object is: drifted, shrunk, expanded, changing posture, or rotated by an angle θ due to camera rotation. In order to accommodate and not to miss these variations, the bounding box is extended. This extended bounding box is denoted as $EBbnew_{x',y',h',w'}$.

F. Automatic Selective Filtering for Subsequent Frames

The pixels within the extended bounding box $EBbnew_{x',y',h',w'}$ are considered at step 110 for automatic selective filtering. A mean shift algorithm is used as a pre-segmentation step to obtain unique labels for each region. In exemplary embodiments of the invention, the following steps may be performed before applying automatic selective filtering, as detailed in co-owned U.S. patent application Ser. No. 14/496,544.

a) The border regions, i.e. the default background B, are scrutinized against the virtual foreground $V_f$ information, to obtain possible foreground $P_f$ and possible background $P_b$ regions. The possible foreground $P_f$ and possible background $P_b$ can be obtained through the intelligent background selection described in U.S. Ser. No. 14/496,544 and a new label $L_{new}$ is obtained.
b) Each distance of each virtual background region $V_b$ is checked against possible foreground regions $P_f$ and if the mean color distance is less than a threshold, then those checked regions are removed from the list of virtual background regions $V_b$, and denoted by $V_b'$. This step is helpful for cases where there are low contrast foreground and background regions.
c) The obtained possible background regions $P_b$ are merged with the virtual background $V_b'$ for obtaining total background $T_b$.

$$T_b = P_b \cup V_b' \quad \text{Eq. 7}$$

The foreground and background information is segmented, for example by using the discrimination filter as described in FAST INTERACTIVE IMAGE SEGMENTATION BY DISCRIMINATIVE CLUSTERING *[Proceedings of the 2010 ACM Multimedia Workshop on Mobile Cloud Media Computing, MCMC '10, pages 47-52, 2010, by Dingding Liu, Kari Pulli, Linda G. Shapiro and Yingen Xiong]* with the virtual foreground $V_f$ and the total background $T_b$ information as inputs. The steps under section B above (Selective Filtering on a First Frame) are used to obtain segmented foreground $SW_f$ and segmented background $SW_b$.

G. Calculate Accurate Center

The resulting foreground regions $SW_f$ of step 110 are binarized at step 112 (e.g., each pixel is assigned one of only two possible values). The binary image should contain the intended object to be tracked. However, the center of the object is not appropriate until the size and shape of the detected object is compared with the intended object. The detected object may have extra regions due to colors in the background that are similar to the foreground that touch some portion of the foreground. In these cases, the calculation may become inaccurate and the center of the object may drift. Finding the accurate center ensures that the subsequent analysis of the video remains accurate. The binarized output of the previous frame with the exact bounding box is considered as a template h. The binarized output of the current frame with the extended bounding box is considered as search image Is. With these two cropped images 2D-normalized cross correlation, for example as described in document [17], is applied to obtain the accurate center $Ca_{x,y}$. The step of finding the accurate center helps processing further frames.

H. Find and Remove Suspect Regions

Once the accurate center of the object is calculated in a current frame, suspect points are found by the following steps:

a) The previous frame object $I_t$ is dilated with structure element of disk $SE_{disk}$ with radius R to obtained a dilated object $DPF_o$ which can be represented as:

$$DPF_o = I_t \oplus SE_{disk} \qquad \text{Eq. 8}$$

The perimeter of the $DPF_o$ is used to obtain the contour $Con_{dt}$, which is shifted to the new center $Ca_{x,y}$. The radius R essentially expands the contour from the previous frame object $I_t$ by the disk diameter 2R.

b) The perimeter of the previous frame object $I_t$ is used to obtain the contour $Con_t$, and similarly, the perimeter of the current frame object $I_s$ is used to obtain the contour $Con_s$.

c) Quantize the contour for different degree level deg and termed as $Con_s^q$ from the current center $Ca_{x,y}$ in the current frame $I_s$ and compute the distance $d_s$ information for each quantized angle including multiple intersect points. Similarly, quantize the contour for the same degree level deg and termed as $Con_t^q$ from the current center $Ca_{x,y}$ in the previous frame $I_t$ and compute distance $d_t$. In certain embodiments of the invention the different degree level deg is chosen depending upon the desired level of accuracy.

d) Optionally, perform affine transform between $I_t$ and $I_s$ if there is any rotation in the camera movement before performing the suspect points procedures.

e) Find similarity for each quantized current frame contour information $Con_s^q$ with respect to quantized previous frame contour information $Con_t^q$. To do that, take each quantized current contour information $Con_s^q$ and find the corresponding point in the quantized previous frame contour information $Con_s^q$ based on angle and distance information. If more corresponding points in the current frame are available than at the same angle in the previous frame, then find the nearest point $N_p$ with respect to that angle and set the following criteria with corresponding points on the previous frame $C_i$:

$$\text{if } abs(N_p - C_i) < thr_{near} \qquad \text{Eq. 9}$$

perform similarity match;

else

Mark as suspect points (S P);

For each corresponding point, a circular disk of radius $R_{disk}$ is taken on the current frame segmented image and the previous frame segmented image. The pixels within a circular disk belonging to foreground $SFSeg_f$ are considered, whereas the background $SFSeg_b$ are not taken into account for calculating the color histogram. The color histogram is computed separately for the previous frame corresponding point foreground $SFSeg_f$ pixels within circular disk and the current frame corresponding point foreground $SFSeg_f$ pixels within circular disk. The RGB color space is used to compute the color histogram. Each color channel is uniformly quantized into 8 levels in this embodiment, and then a histogram of each circular disk of each corresponding point is calculated in the feature space of 8×8×8=512 bins. $Hist_{C_i}$ denotes the normalized histogram of each corresponding point region $C_i$. Here, the Bhattacharya coefficient, described in documents [15, 18], is used to measure the similarity between $m^{th}$ and $n^{th}$ corresponding point regions, $$\rho(m,n) = \Sigma_{u=1}^{512} \sqrt{Hist_m^u \cdot Hist_n^u} \qquad \text{Eq. 10}$$

where the Bhattacharya coefficient ρ varies from 0 to 1 and superscript u represents $u^{th}$ element of the normalized histogram bin. The higher the Bhattacharya coefficient between m and n, the higher the similarity is between them.

f) If this similarity is less than or equal to Y % for quantized contour points, then those points are termed as suspect point (SP). The value for Y can be a default value in the algorithm, or modified by the user.

g) The suspect points SP are measured with a shape calculation in step a); that is if the SP falls outside the contour $Con_{dt}$ then these are termed as Defect Points DP. These Defect Point DP regions are removed.

h) Find label $L_{new}$ for all the defect points DP and remove the regions $DP_f$.

$$SW_f' = SW_f \not\ni DP_f \qquad \text{Eq. 11}$$

This step helps in removing most of the extra regions.

I. Remove Residual Regions

After suspect points are removed there might be residual regions which still reside within the suspect regions. The following steps are performed to remove these regions:

a) Analyze the extra region along the dilated contour $Con_{dt}$ of the previous frame object, and perform an '&' operation between $SW_f$ output and the dilated contour $Con_t$ from the previous frame object and find the pixels to be analyzed $Pi_{anal}$ in the current frame.

b) Calculate the angle and distance information from the center in the current frame detected object for each pixel of $Pi_{anal}$. This is termed as a quantized angle map $QA_{map}$.

c) The steps c) to e) from the previous section H (Find and Remove Suspect Regions) are used to calculate the suspect Points $SP_2$.

d) The suspect points $SP_2$ are considered defect points $DP_2$. Find label $L_{new}$ for all the defect points $DP_2$ and remove the regions $DP2_f$.

$$SW_f'' = SW_f' \not\ni DP2_f \qquad \text{Eq. 12}$$

J. Final Segmentation with Pruning

In the final stage, the isolated foreground regions are removed from $SW_f''$ other than the largest object. This will help keep the largest object intact. This final segmentation is termed as $SFSeg_f$.

Figure 2:
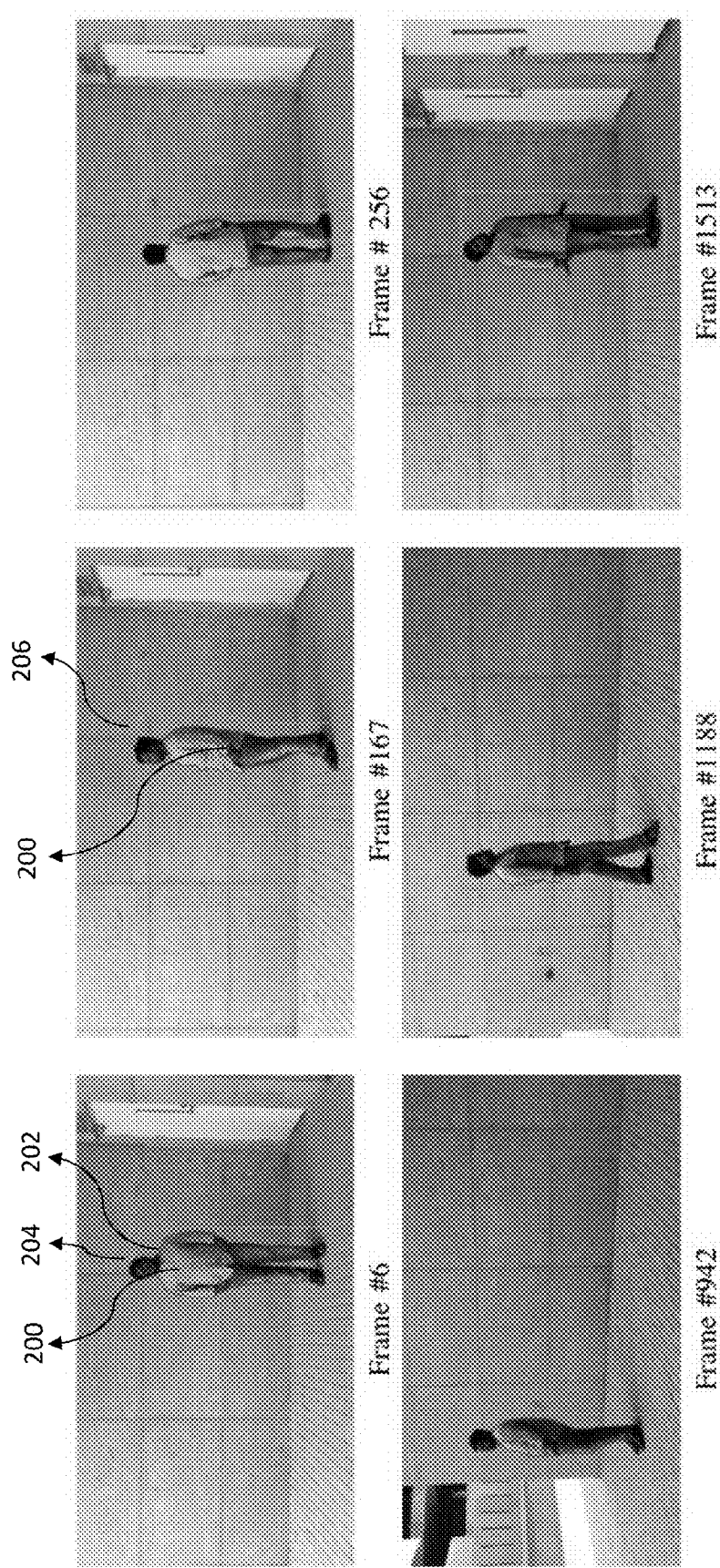
FIGS. 2-4 each illustrate multiple frames from different example videos, each with a different object being tracked according to exemplary embodiments of the invention.
Figure 4:
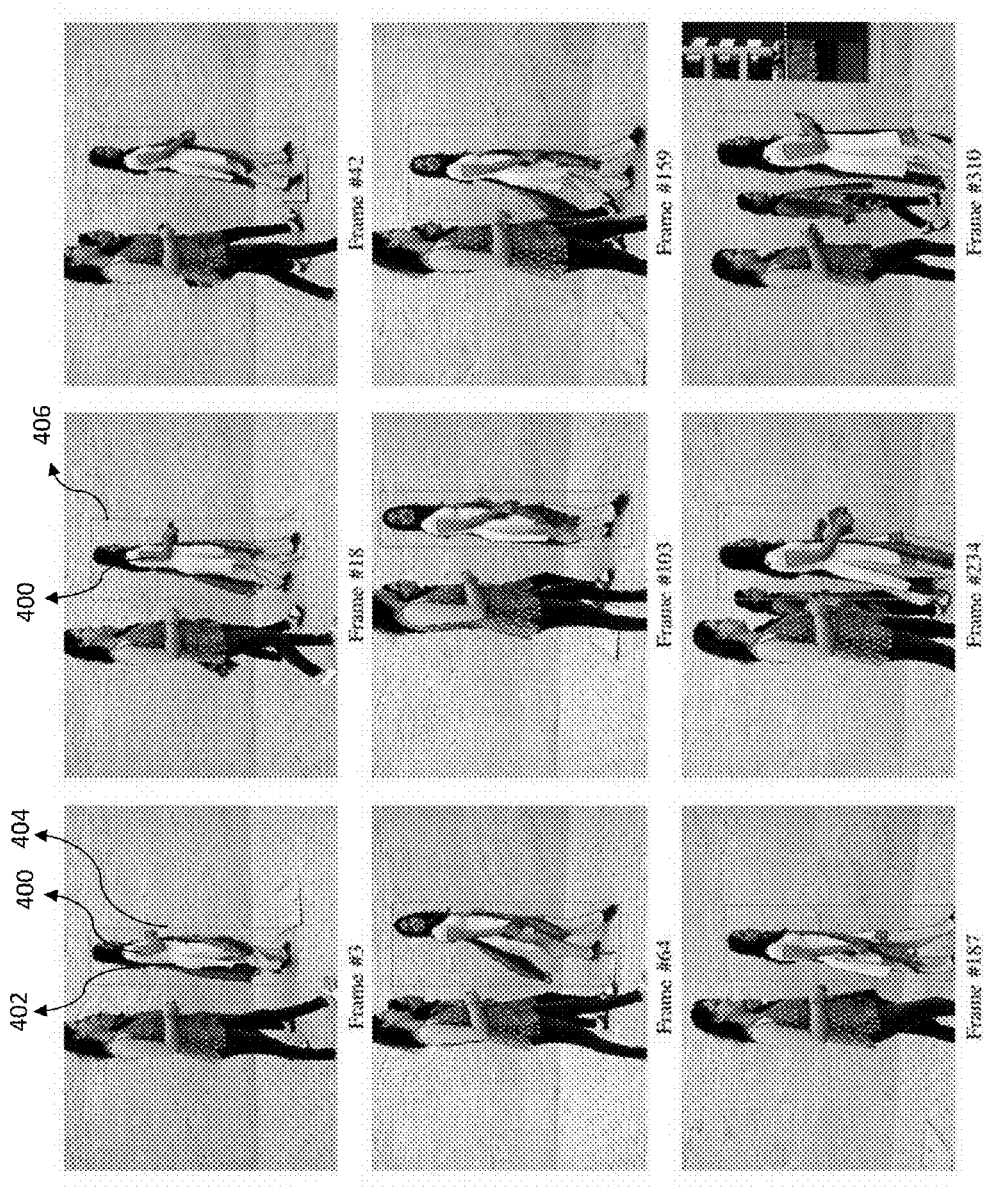
Figure 5:
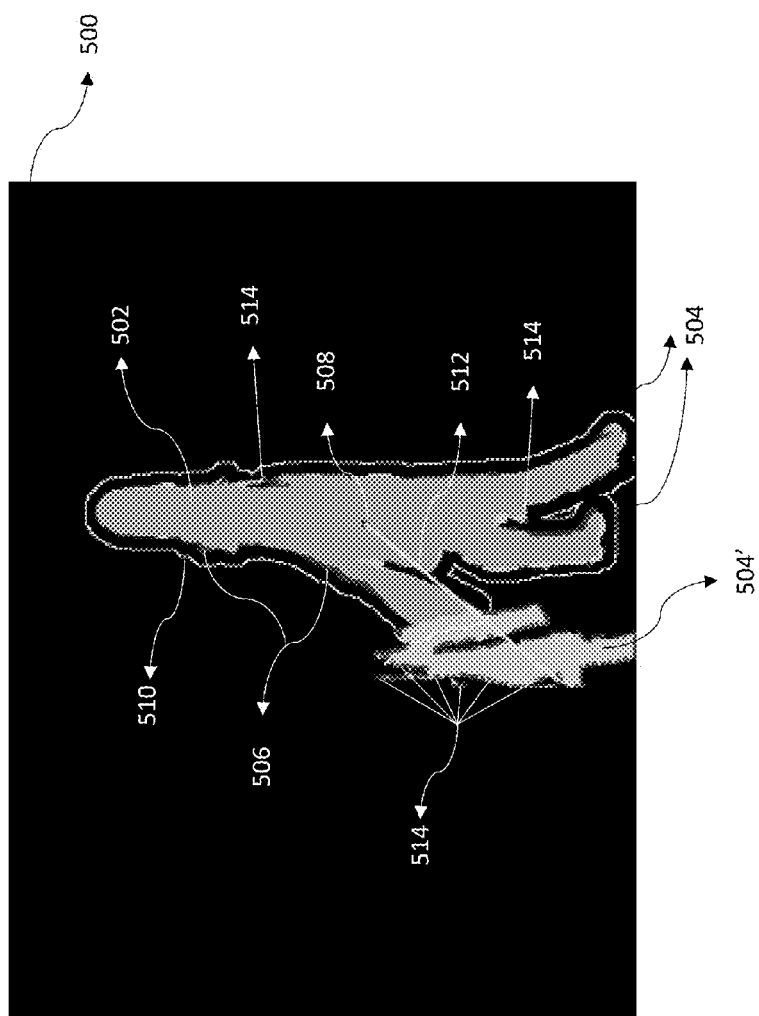
FIG. 5 illustrates a video frame from the FIG. 4 example with different regions with differently indicated foreground regions, background regions, the object's center, and potential changes in the object's shape from a previous frame according to embodiments of the invention.
Figure 6:
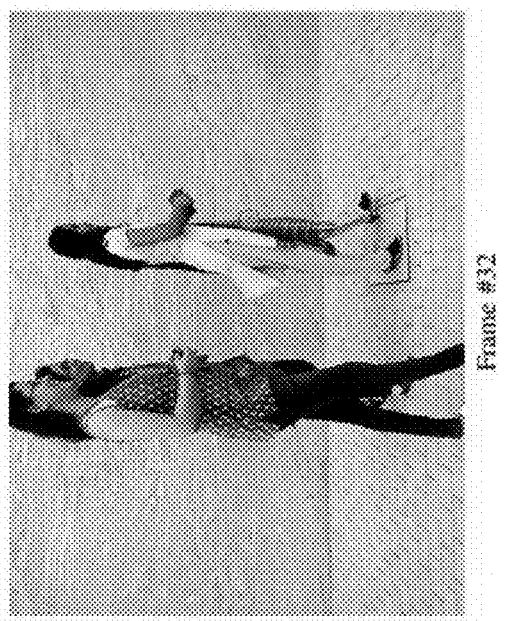
FIG. 6 illustrates two consecutive frames form the FIG. 4 example with expanded portions of each frame showing the center of the object to be tracked, and also similarity between two regions of each frame according to embodiments of the invention.
Figure 6:
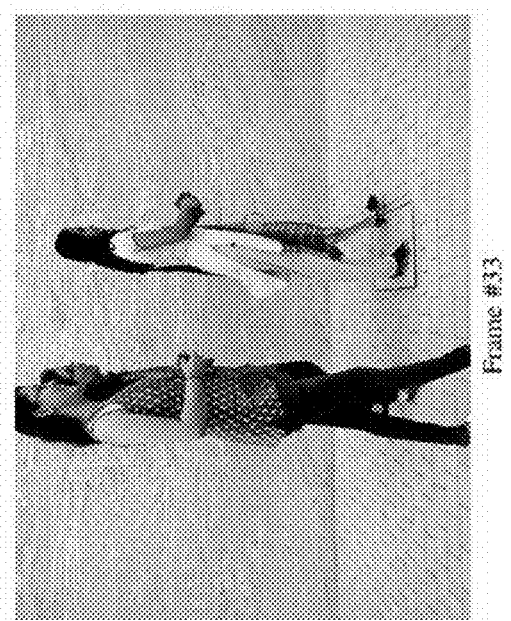
Figure 6:
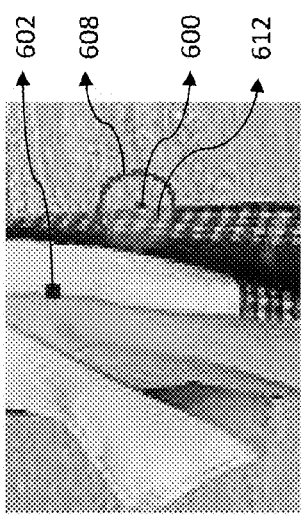
Figure 6:
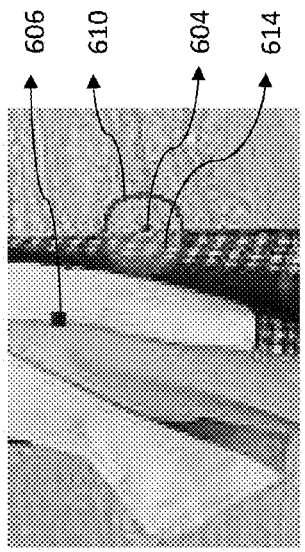

FIGS. 2-7 illustrate certain aspects of the above-described invention as applied to example video frames. While the example algorithm developed and tested by the inventors operates on each and every frame of the video in which the object being tracked appears, only a few non-consecutive frames are shown in FIGS. 2-4 and 7 to better depict for the reader wide changes to the object's orientation, position and lighting that may be successfully tracked by this example algorithm. FIG. 6 illustrates two consecutive frames of a video. FIG. 2 illustrates a single object case. In frame #6, a man 200 is standing looking at the camera with his hands in his pockets. The man 200 represents the object to be tracked in the video. The man is shown rotating and moving around in the subsequent frames. The contour 202 surrounding the man shows the result of filtering the first video frame to delineate foreground from background according to embodiments of the invention. In frame #6, the background region is considered to be everything outside of the contour 202, whereas the area within the contour 202 is the foreground region. Frame #6 also shows a virtual bounding box 204 which minimally encloses the man/object contour. Frame #167 shows that the man 200 has turned to his right side thus changing the contour of the man as compared to frame #6. If we assume for example that the algorithm of FIG. 1 is operating on consecutive video frames from the FIG. 2 video clip, then the virtual bounding box 204 at frame #6 is the first virtual bounding box (VBbox1) of the 'first' frame and is used to generate the second virtual bounding box (VBbox2) in consecutive frame #7 (not shown) when the algorithm operates to isolate the object (the man 200). As the algorithm progresses through each and every video frame it eventually processes the illustrated frame #167, after processing the 'first' frame #166 in which is established a virtual bounding box. When describing the process for frame #167, the virtual bounding box previously established for the preceding frame #166 is then considered first virtual bounding box (VBbox1) vis a vis frame #167. During this processing for frame #167, a new center of the second virtual bounding box 206 VBbox2 is determined and VBbox2 is expanded by some x %, as described for FIG. 1. The other frames in FIG. 2 illustrate further frames in the video where the man 200 is tracked according to embodiments of the invention. In frame #942 the man 200 moves some distance from the camera, and there is some variation in the lighting to the left of the man in this frame. Despite these changes, the background and foreground of the frame are still accurately filtered, using initially parameters (and VBbox1) from one or more 'first' frames preceding the current frame being processed. Similarly, in frame #1188 the scale of the man has changed but the tracking of the man remains accurate.

Figure 3:
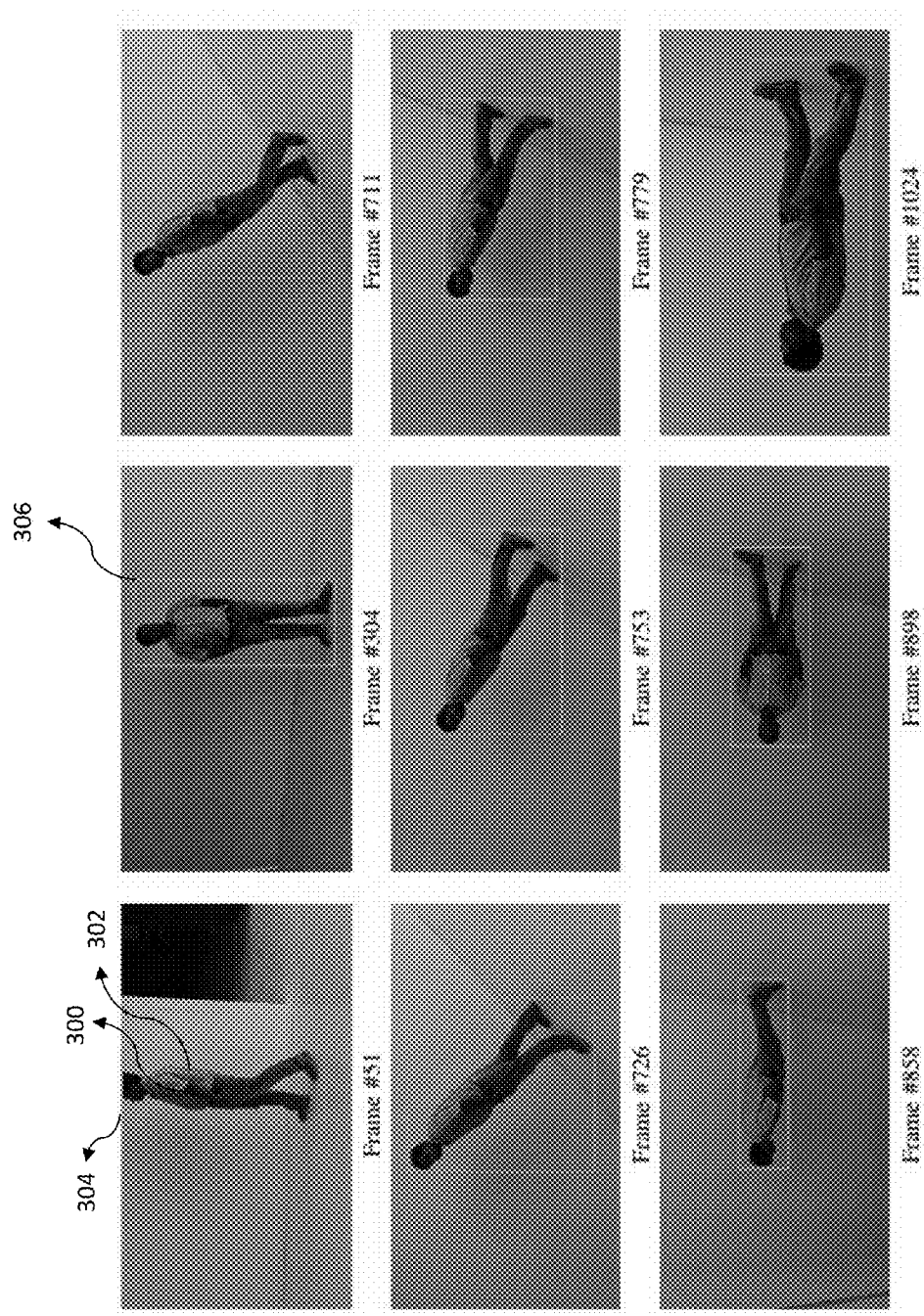

FIG. 3 illustrates a situation where an object is rotated in a video. In this case the object 300 is a man. Frame #51 is filtered according to embodiments of the invention to segment the background and foreground of the frame. The contour 302 is shown outlining the man 300 and the virtual bounding boxes VBbox1 302 and VBbox2 306 are constructed similar to those detailed above for FIG. 2. The camera begins rotating in frame #711 and rotates 90° by frame #858. The new bounding box VBbox2 in each frame being processed by the algorithm of FIG. 1, with its new center and expanded by some x % over the virtual bounding box established for the previous frame, enables the object 300 to be tracked accurately despite such camera rotation. Embodiments of the invention successfully track and segment the object 300 in this scenario, whereas prior art approaches to object tracking are seen to have particular difficulty tracking rotating objects. It is also noted that a portion of man's 300 head is hidden due to camera movement in frame #51, yet the overall object is correctly tracked by the algorithm presented herein as seen in the other frames of FIG. 3.

FIG. 4 provides an example video where there are multiple objects and only one of the objects is to be tracked according to embodiments of the invention. In other embodiments the tracking algorithm can run in parallel or serially across the same video to separately track multiple objects across the same frames of a video. FIG. 4 shows nine different frames from the video with three women walking. The object to be tracked in this example is the woman 400, who in the actual color video is dressed in a pink top with the dupatta. The frames in this video present multiple challenges for a tracking algorithm in comparison to a video with only a single object, but still the object contour 402 enclosed by the virtual bounding boxes VBbox1 404 and VBbox2 406 in the different video frames accurately track her 400. For example, in frame #159 the dupatta of the woman 400 flies in the air and touches one of the other women who are background in the frame. This type of movement can occur within the span of only a few frames or even a single frame. Additionally, in the actual video from which FIG. 4 is taken the hair color of the woman 400 is essentially the same as the pant color of the other woman which makes it harder to delineate the foreground color via color distance. Similar to FIGS. 2 and 3, the contour 402 of the woman 400 in frame #3 is shown and a first virtual bounding box VBbox1 404 is shown minimally enclosing the woman 400. Subsequent frames of the video show the woman 400 being tracked as the three women walk towards the right of the frame where in each new frame being processed a new virtual bounding box VBbox2 406 is constructed with a new center and then expanded by some x % to capture any inter-frame relative movement of the object 400 being tracked. For the example algorithm tested by the inventors, each new virtual bounding box VBbox2 for a current frame being processed was expanded by that x % over the first virtual bounding box VBbox1 which was established in the immediately preceding frame. FIGS. 5 and 6 show specific frames of the same video of FIG. 4 but further illustrate that frame's virtual bounding box for certain embodiments of the invention which help provide improved accuracy in tracking objects when difficult situations exist such as those shown in frame #159.

FIG. 5 shows frame #159 from the example video of FIG. 4 which represents an intermediate step of certain embodiments of the invention. The regions of a previous consecutive frame and the current frame in FIG. 5 are binarized such as via a conventional k-d tree as mentioned above and are cross-correlated 500, where region 502 indicates common pixels of the object between the binary image of the previous frame and the binary image of the current frame. The regions 504, 504' indicate regions of the frame that are newly (and tentatively in this intermediate step) identified as part of the object with respect to the previous frame. Some of these regions 504 show the slight drift of the woman 400 as she walks, for instance around her legs and face. In other parts of the frame, some of these regions 504' indicate newly identified regions which were not present in the previous frame and which the algorithm will eventually identify as not part of the intended object, in this case particularly the leg of the other woman who is touching the dupatta of the woman 400 to be tracked. Regions 506 represent regions that were identified in the previous frame as being part of the object being tracked but which are not part of the object in the current frame, and are shown for the viewer's convenience. An accurate center 508 for the new bounding box VBbox2 in this current frame of FIG. 5 is calculated based on the cross-correlation of the binarized regions from the consecutively previous frame and the current frame.

According to certain embodiments of the invention, FIG. 5 shows a line 510 which indicates a dilated (second or current frame) contour of the object to be tracked in the current (second) frame which is calculated by dilating the (first) contour of the object in the previous (first) frame (e.g., using the disk with radius R as detailed above). The contour of the object in the first frame is dilated and this dilated contour is shifted so that the center of this dilated contour lies at the determined accurate center of the object in the second frame. This is represented in FIG. 5 as the contour 510. The previous frame contour and the current frame contour are each quantized for a set of degree levels from the accurate center 508 to obtain a first and second set of points, respectively. Another line 512 shows a specific degree level corresponding to one of the points of one of the sets, and the algorithm considers a similar such line 512 for each point in each of the two sets. In certain embodiments of the invention, the color similarity of respective areas surrounding distinct points in the first set are compared to the corresponding distinct points in the second set. This comparing step is shown more specifically in FIG. 6.

FIG. 6 shows two consecutive frames from the example video from FIG. 4, and further shows enlarged portions of each of these frames. Consider for FIG. 6 that frame #32 is the first frame, and that frame #33 is the second frame which is currently being processed by the algorithm using what the algorithm particularly identified as the object in the first frame #32. The enlargement of frame #32 shows one specific point 600 from the first set of points at a specific degree level from the accurate center 602 of the first virtual bounding box VBbox1, and the corresponding point 604 from the second set is shown in the enlargement of frame #33 at the same degree level from the accurate center 606 of the second virtual bounding box VBbox2. For these 2 frames in particular it happens that the accurate centers 602, 606 are identical, which the algorithm can find by cross correlation as mentioned above. The surrounding area of each of these points 600, 604 is the area enclosed by circular disk 608 and circular disk 610, respectively. According to certain embodiments of the invention, the foreground region 612 of the previous/first frame #32 is compared to the foreground region 614 of the current/second frame #32 for at least color similarity. If the color similarity does not meet some predetermined threshold then the surrounding area is removed from the identified object to be tracked. In one embodiment, only the pixels within the circular disks 608, 610 which are considered as foreground are considered to be part of the tracked object and the pixels of the background regions are not taken into account; the specifically illustrated circular disks 608, 610 encompass both foreground/object pixels and background pixels to better illustrate the disks to the reader.

Returning back to FIG. 5, points 514 are points in the second set which lie outside the dilated contour and are considered 'defect' points. This helps in situations where new regions, for example the leg 504 of the other woman who is not the tracked object, are added to the identified object foreground region. As such, the number of points may be different for the first set and the second set. For example, if there is no corresponding point in the second set for a point in the first set, then the nearest corresponding point will be calculated and used for match similarity. On the other hand, there may be one or more coordinating points in the second set for a given quantized angle. For instance, the line 512 intersects two points in the first set that are generated for the previous frame, but four points in the second set that is being evaluated in the current frame because of the added region 504. Also note that some of the 504 regions, which are inside the dilated contour, are not considered for evaluation, assuming these regions are part of the object and lie inside the dilated contour. In certain embodiments of the invention, only the point of the second set along a given quantized angle that is nearest to the corresponding point in the first set along that same quantized angle is considered when identifying the object in the current/second frame.

Figure 7:
FIG. 7 illustrates a further example, frames of a video conference in which a person is being tracked in each illustrated frame shown according to embodiments of the invention.

FIG. 7 shows a video conference with a man being tracked. The algorithm performs well as shown in FIG. 7, which particularly illustrates the changed bounding box in different frames to enclose the changed contours of the man/object being tracked. See particularly the differences in contour and bounding box as between frame #779 and #947 and #1041 where the tilt of the man's head changes noticeably.

Figure 8:
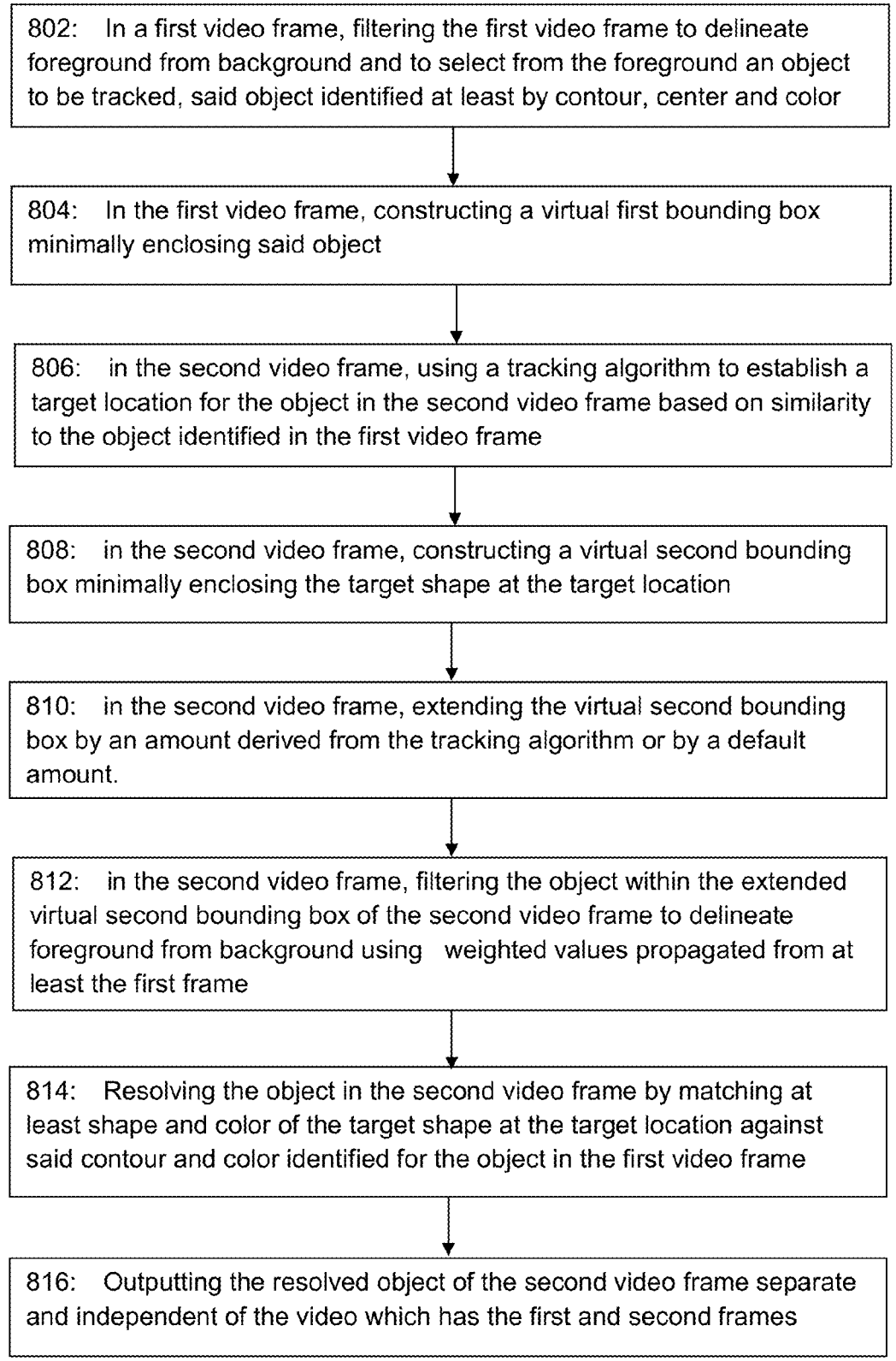
FIG. 8 is a process flow diagram showing operation of an apparatus according to certain exemplary embodiments of these teachings.

FIG. 8 is a logic flow diagram that summarizes some of the above embodiments for tracking an object in a video using a personal or business computer or some other such computing device. The term video necessarily implies an ordered series of video frames. Referring to FIG. 8, at block 802 a first video frame is filtered to delineate a foreground from a background of the first video frame and an object to be tracked is selected from the foreground. For the case in which this first frame is the initial frame of the video in which the object to be tracked is present, the user markings can be used to initiate this delineation and/or object selection as is more fully described in co-owned U.S. application Ser. No. 14/496,544. This object to be tracked is identified at least by contour, center and color. At block 804 a virtual first bounding box VBbox1 is constructed, minimally enclosing said object of the first video frame. In the above examples the contour of the object in the first frame is used as what is to be minimally enclosed by the first bounding box VBbox1.

At block 806, in the second video frame a tracking algorithm is used to establish a target shape at a target location for the object in the second video frame based on similarity to the object identified/selected in the first video frame. In the above examples the dilated/new contour of the object in the second frame is used as this target shape. At block 808, a second virtual bounding box VBbox2 is constructed which minimally encloses the target shape at the target location. At block 810, in the second video frame, the virtual second bounding box VBbox2 is extended by some predefined such as x % which may be derived from the tracking algorithm, or in some embodiments x % may be a default amount. Such a default amount is predefined in the algorithm itself or by a specific user input of a value for x % when running the algorithm.

At block 812, in the second video frame, the object within the extended second virtual bounding box VBbox2 of the second video frame is filtered to delineate foreground from background using weighted values propagated from at least the first frame and from one frame previous to the first. If the 'first' frame is in fact the initial frame of the video in which the object appears or is otherwise identified, then of course the values are not weighted as there is only one frame previous to the current frame being processed by the algorithm. The filtering uses weighted values which are propagated from at least the first frame and preferably propagated from the true first frame where the object first appears (or is first identified by the algorithm or by a user) and from interim frames for the case in which this 'second frame' is a further frame that is processed after the true first video frame and other interim video frames are processed, in which case the first frame of block 802 is an interim frame. Then at block 814, the object is resolved in the second video frame by matching at least shape and color of the target shape at the target location against said contour and color identified for the object in the first video frame.

At block 816 the resolved object of the second video frame is output, separate and independent of the original video which has the first and second frames, to a tangible memory and/or to a graphical display. For example, the resolved object of the second video frame can be output in a digital video stream of the object resolved from all the video frames, or with other tracked objects of the same original video that the algorithm operated on in parallel or in series.

The logic diagram of FIG. 8 may be considered to illustrate the operation of a method, and a result of execution of a computer program implementing the algorithm described herein that is tangibly stored on a computer readable memory, and a specific manner in which components of an electronic computing device are configured to cause that electronic device to operate. The various blocks shown in FIG. 8 may also be considered as a plurality of coupled logic circuit elements constructed to carry out the associated function(s), or specific result of strings of computer program code or instructions tangibly stored in a memory.

Figure 9:
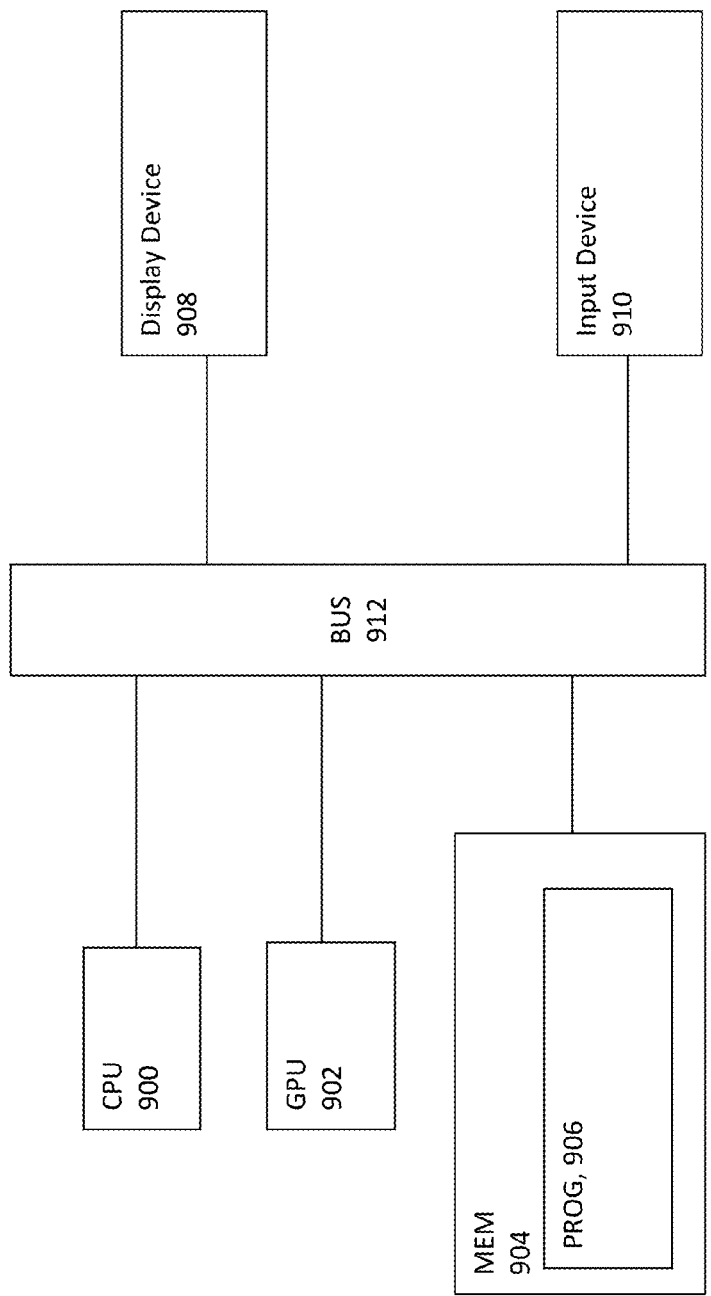
FIG. 9 is a high level schematic block diagram illustrating a computing device that is suitable for practicing the described and exemplary embodiments of these teachings.

As shown in the high level block diagram of FIG. 9 an example computing system is shown, which includes processing means such as at least one central processing unit (CPU) 900, a graphics processing unit (GPU) 902, storing means such as at least one computer-readable memory (MEM) 904 storing at least one computer program (PROG) 906, a display device 908, and an input device 910, which are connected to communicate with one another through a bus 912. The various functional blocks of FIG. 9 may or may not all be co-located within a unitary computing device, such as for example when the user operates the input device 910 and views the display device 908 while running the PROG 906 from a remote MEM 904 accessed over a network (such network in this case at least partially replacing the bus 912). In this case the input device 910/display device 908 may be controlled by a separate CPU 900/GPU/902 than the MEM 904. Also stored in the MEM 904 at reference number 906 are the computer code or computer implementable algorithm(s) for the computer system to at least filter the video frames of the video to delineate the foreground and background regions of an object to be tracked, to construct the first virtual bounding box, use the tracking algorithm to establish a target shape at a target location, construct and extend a second virtual bounding box, and to identify and resolve the object within the extended second virtual bounding box according to the exemplary embodiments described above.

The computer readable memory 904 may comprise a random access memory (RAM) and a mass storage. Various embodiments of the computer readable MEMs 904 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like.

The CPU 900, the GPU 902, and the memory 904 are shown as separate components, however in some embodiments, the memory 904 may be integrated with one or both of the CPU 900 and the graphics processor 902. In some embodiments, the memory 904 may be shared dynamically by the CPU 900 and the graphics processor 902. In some embodiments, memory 904 is used by the CPU 900, and a second graphics RAM is dedicated for the use by the graphic processor 902. In some embodiments, the GPU 902 may be integrated with the CPU 900. In some embodiments, the computer system in FIG. 9 may lack a dedicated GPU 902, and the CPU 900 may be adapted to perform computations in place of the GPU 902. The CPU 900 and the graphic processor 902 may be operating in either single precision floating point (32-bit) or double precision floating point (64-bit) format.

The input device 910 may be a commonly known device for providing user input to a computer system, such as a mouse, a keyboard, a touch pad and/or a touch screen, or a transducer (e.g., a microphone) in conjunction with voice recognition software. The computing system may have further and different types of input devices 910 for receiving the video in which the one or more objects are tracked, such as for example a wireless receiver (e.g., broadcast, cellular, WLAN, Bluetooth and the like), a data port for receiving a wire or cable over which the video is input from a network, camera or external memory, and the like. After input from whatever source and type of input device 910 the video may be stored in the MEM 904 while the object is being tracked. The display device 908 may be a commonly known graphical display screen or projector for displaying graphical images to a user. Although shown as separate blocks, the display device 908 and the input device 910 may be integrated with one another, such as may be the case with a touch screen device. In some embodiments, the bus 912 may include a north bridge for connecting the CPU 600, the graphics processor 902, and the memory 904, and a south bridge for connecting the display device 608 and the input device 910, or the bus may be embodied as a hardwire connection among some components and also a networked connection between other remotely-located components.

In some embodiments, the input device 910 is adapted to provide commands to identify the object to be tracked in the first frame of the video to the CPU 900. The commands may be entered through a user interface displayed on the display device 908. For example, a user many select points indicating an object or a portion of the object in a video frame or select portions of the frame which represent a background or foreground of the video frame through the user interface. The video may be any type of file which contains at least two frames, including or the like. In some embodiments, the application of the input markers may be triggered by another program running on the computer system. The image file may be stored on the memory 904 and retrieved by the CPU 900 to be displayed on the display device 908.

In general, the various embodiments of the computer system in FIG. 9 can include, but are not limited to workstations, servers, personal desktop computers, laptop or tablet computers, and even personal portable digital devices having wireless communication capabilities, including but not limited to handheld or wearable computers such as cellular phones and smart phones, Google glass devices, and the like. In certain embodiments the tangible output from the algorithm is, for at least one frame processed by the algorithm, the object resolved in that frame separate from the video itself. For example, where the output is a series of the tracked object in the various frames the algorithm may output a live stream of the tracked object or objects (e.g., without background segments of the original video from which they were taken) or an offline video stored on a tangible memory media (electronic or optical) of such tracked object/objects without the background segments. These various outputs may be used for video conferencing, for editing the object which may later be re-merged with the original background segments or with new and different background segments, and/or for analysis of the objects movement style such as where the object is a person and the original video is captured by a security camera.

Certain embodiments were tested with the following parameter values on the example videos described above:
  previous three frames strong foreground, that is X=3,
  x=10% as bounding box extension,
  radius R=10 for dilated contour,
  quantize the contours with 1° level, that is deg=1°
  circular disk of radius $R_{disk}$=10 for quantized contour points,
  Y=80% as minimum threshold for histogram similarity criteria, and
  nearest corresponding point threshold as $thr_{near}$=10.

Image segmentation is often assessed using a series of groundtruth segmentation maps, which usually involve the following quantities: the number of true positives (TP), which counts the number of correctly detected foreground pixels; the number of false positives (FP), which counts the number of background pixels incorrectly classified as foreground; the number of true negatives (TN), which counts the number of correctly classified background pixels; and the number of false negatives (FN), which accounts for the number of foreground pixels incorrectly classified as background.

The metric most widely used in computer vision to assess the performance of a binary classifier is the Percentage of Correct Classification (PCC), which combines all four values:

$$PCC = \frac{TP + TN}{TP + TN + FP + FN}$$

The PCC was calculated for the example videos described above and are shown in Table I below.

TABLE I

COMPARISON OF ALL ALGORITHMS BY PERCENTAGE OF CORRECT CLASSIFICATION

| Video Sequence | Total number of frames | Frame No. | Accuracy % |
|---|---|---|---|
| Single Object | 1565 | 6 | 99.59 |
| | | 167 | 99.66 |
| | | 256 | 99.58 |
| | | 942 | 99.63 |
| | | 1188 | 99.55 |
| | | 1513 | 99.45 |
| Camera rotation | 1252 | 51 | 99.55 |
| | | 304 | 98.02 |
| | | 711 | 99.15 |
| | | 726 | 99.17 |
| | | 753 | 99.17 |
| | | 779 | 99.32 |
| | | 858 | 99.46 |
| | | 898 | 98.89 |
| | | 1024 | 98.67 |
| Multiple object | 342 | 3 | 99.28 |
| | | 18 | 99.40 |
| | | 42 | 99.42 |
| | | 64 | 99.44 |
| | | 103 | 99.31 |
| | | 159 | 99.22 |
| | | 187 | 99.37 |
| | | 234 | 99.07 |
| | | 310 | 98.87 |
| Video conferencing | 1050 | 8 | 99.34 |
| | | 14 | 99.36 |
| | | 79 | 99.45 |
| | | 175 | 99.44 |
| | | 327 | 99.51 |
| | | 513 | 99.48 |
| | | 779 | 99.30 |
| | | 947 | 99.26 |
| | | 1014 | 99.32 |

We claim:

1. A computer-implemented method for tracking an object in a video, the method comprising:
    in a first video frame of the video:
        filtering the first video frame to delineate foreground from background and to select from the foreground an object to be tracked, said object identified at least by contour, center and color;
        constructing a first virtual bounding box minimally enclosing said object; in a second video frame of the video:
        using a tracking algorithm to establish a target shape at a target location for the object in the second video frame based on similarity to the object identified in the first video frame;
        constructing a second virtual bounding box minimally enclosing the target shape at the target location;
        extending the second virtual bounding box by a predefined amount;
        filtering the object within the extended second virtual bounding box of the second video frame to delineate foreground from background using weighted values propagated from at least the first frame;
        resolving the object in the second video frame by matching at least shape and color of the target shape at the target location against said contour and color identified for the object in the first video frame; and
    separate and independent of the video, outputting the resolved object of the second video frame to a tangible memory and/or to a graphical display.

2. The computer-implemented method according to claim 1, wherein:
    filtering the first video frame comprises binarizing regions of the delineated foreground of the first video frame that lie within the first virtual bounding box;
    filtering the object within the extended second virtual bounding box comprises binarizing regions of the second frame that lie within the extended second virtual bounding box; and
    constructing the second virtual bounding box comprises calculating an accurate center of the object within the extended second virtual bounding box by cross-correlating the binarized regions that lie within the first virtual bounding box and that lie within the extended second virtual bounding box.

3. The computer-implemented method according to claim 2, further comprising:
    dilating the contour of the object in the first video frame and shifting the dilated contour to the accurate center to obtain a current frame contour of the object identified in the second video frame, said current frame contour at the accurate center comprising the target shape at the target location;
    quantizing contour of the object in the first video frame for a set of degree levels from a center of the object in the first video frame to obtain a first set of points along the contour of the object in the first video frame;
    quantizing the current frame contour of the object identified in the second video frame for the set of degree levels from the accurate center to obtain a second set of points along the current frame contour;
    comparing at least color similarity of respective areas surrounding distinct points in the first set to areas surrounding corresponding distinct points in the second set; and
    for each distinct point in the second set for which the comparing does not meet a color similarity threshold, removing from the identified object the respective surrounding area.

4. The computer-implemented method according to claim 3, further comprising:
    for the case that multiple points of the first set correspond to only one point from the second set, removing from the first set all of the multiple points except the one point of the multiple points that is nearest to the first set point at that angle.

5. The computer-implemented method according to claim 3, wherein:
the dilating comprises using a disk structural element with a radius R; and
the respective areas surrounding the distinct points are defined by a circle with the radius R centered at each respective distinct point.

6. The computer-implemented method according to claim 1, wherein the tracking algorithm is a mean-shift tracking algorithm.

7. The computer-implemented method according to claim 1, wherein filtering the first video frame comprises using a set of user input markers to delineate the foreground from the background.

8. The computer-implemented method according to claim 1, wherein:
the first video frame is the first frame of the video in which the object appears; and
iteratively executing the steps recited for the second video frame on the second video frame and on at least one subsequent video frame in the video.

9. A computer-readable memory storing a program that is executable by a computing device to track an object in a video, the program comprising:
in a first video frame of the video:
code for filtering the first video frame to delineate foreground from background and to select from the foreground an object to be tracked, said object identified at least by contour, center and color;
code for constructing a first virtual bounding box minimally enclosing said object;
in a second video frame of the video:
a tracking algorithm for establishing a target shape at a target location for the object in the second video frame based on similarity to the object identified in the first video frame;
code for constructing a second virtual bounding box minimally enclosing the target shape at the target location;
code for extending the second virtual bounding box by a predefined amount;
code for filtering the object within the extended second virtual bounding box of the second video frame to delineate foreground from background using weighted values propagated from at least the first frame;
code for resolving the object in the second video frame by matching at least shape and color of the target shape at the target location against said contour and color identified for the object in the first video frame; and
code for outputting, separate and independent of the video, the resolved object of the second video frame to a tangible memory and/or to a graphical display.

10. The computer-readable memory according to claim 9, wherein:
the code for filtering the first video frame operates by binarizing regions of the delineated foreground of the first video frame that lie within the first virtual bounding box;
the code for filtering the object within the extended second virtual bounding box operates by binarizing regions of the second frame that lie within the extended second virtual bounding box; and
the code for constructing the second virtual bounding box operates by calculating an accurate center of the object within the extended second virtual bounding box by cross-correlating the binarized regions that lie within the first virtual bounding box and that lie within the extended second virtual bounding box.

11. The computer-readable memory according to claim 10, the program further comprising:
code for dilating the contour of the object in the first video frame and shifting the dilated contour to the accurate center to obtain a current frame contour of the object identified in the second video frame, said current frame contour at the accurate center comprising the target shape at the target location;
code for quantizing contour of the object in the first video frame for a set of degree levels from a center of the object in the first video frame to obtain a first set of points along the contour of the object in the first video frame;
code for quantizing the current frame contour of the object identified in the second video frame for the set of degree levels from the accurate center to obtain a second set of points along the current frame contour;
code for comparing at least color similarity of respective areas surrounding distinct points in the first set to areas surrounding corresponding distinct points in the second set; and
code for removing from the identified object the respective surrounding area, for each distinct point in the second set for which the comparing does not meet a color similarity threshold.

12. The computer-readable memory according to claim 11, the program further comprising:
code that is executable conditional on multiple points of the first set corresponding to only one point from the second set, said conditionally executable code for removing from the first set all of the multiple points except the one point of the multiple points that is nearest to the first set point at that angle.

13. The computer-readable memory according to claim 11, wherein:
the code for dilating operates by using a disk structural element with a radius R; and
the respective areas surrounding the distinct points are defined by a circle with the radius R centered at each respective distinct point.

14. The computer-readable memory according to claim 9, wherein the tracking algorithm is a mean-shift tracking algorithm.

15. The computer-readable memory according to claim 9, wherein the code for filtering the first video frame operates by using a set of user input markers to delineate the foreground from the background.

16. The computer-readable memory according to claim 9, wherein:
the first video frame is the first frame of the video in which the object appears; and
the program comprises further code to iteratively execute the operations recited for the second video frame on the second video frame and on at least one subsequent video frame in the video.

17. A computing device comprising:
at least one processor;
at least one memory storing a program; and
at least one input device for receiving a video;
wherein the program, when executed by the at least one processor, operates on the video at least to
in a first video frame of the video:
filter the first video frame to delineate foreground from background and to select from the foreground an object to be tracked, said object identified at least by contour, center and color; and construct a first virtual bounding box minimally enclosing said object;

in a second video frame of the video:

use a tracking algorithm to establish a target shape at a target location for the object in the second video frame based on similarity to the object identified in the first video frame;

construct a second virtual bounding box minimally enclosing the target shape at the target location;

extend the second virtual bounding box by a predefined amount;

filter the object within the extended second virtual bounding box of the second video frame to delineate foreground from background using weighted values propagated from at least the first frame; and resolve the object in the second video frame by matching at least shape and color of the target shape at the target location against said contour and color identified for the object in the first video frame;

and to output, separate and independent of the video, the resolved object of the second video frame to a tangible memory and/or to a graphical display.

18. The computing device according to claim 17, wherein:

the filtering of the first video frame comprises binarizing regions of the delineated foreground of the first video frame that lie within the first virtual bounding box;

the filtering of the object within the extended second virtual bounding box comprises binarizing regions of the second frame that lie within the extended second virtual bounding box; and the constructing of the second virtual bounding box comprises calculating an accurate center of the object within the extended second virtual bounding box by cross-correlating the binarized regions that lie within the first virtual bounding box and that lie within the extended second virtual bounding box.

19. The computing device according to claim 18, wherein the program when executed by the at least one processor operates on the video further to:

dilate the contour of the object in the first video frame and shifting the dilated contour to the accurate center to obtain a current frame contour of the object identified in the second video frame, said current frame contour at the accurate center comprising the target shape at the target location;

quantize contour of the object in the first video frame for a set of degree levels from a center of the object in the first video frame to obtain a first set of points along the contour of the object in the first video frame;

quantize the current frame contour of the object identified in the second video frame for the set of degree levels from the accurate center to obtain a second set of points along the current frame contour;

compare at least color similarity of respective areas surrounding distinct points in the first set to areas surrounding corresponding distinct points in the second set; and for each distinct point in the second set for which the comparing does not meet a color similarity threshold, remove from the identified object the respective surrounding area.

20. The computing device according to claim 19, wherein the program when executed by the at least one processor operates on the video further to:

for the case that multiple points of the first set correspond to only one point from the second set, remove from the first set all of the multiple points except the one point of the multiple points that is nearest to the accurate center.

* * * * *